United States Patent Office 2,871,552
Patented Feb. 3, 1959

2,871,552

WELD METAL DEPOSITS AND ARC WELDING ELECTRODES FOR PRODUCING THE SAME

Tore Måns Ivan Norén, Goteborg, Sweden, assignor to Elektriska Svetsningsaktiebolaget, Goteborg, Sweden, a corporation of Sweden No Drawing. Application March 19, 1956
Serial No. 572,194

Claims priority, application Sweden May 10, 1946

10 Claims. (Cl. 29—194)

This application is in part a continuation of my application Ser. No. 258,293 filed November 26, 1951, now abandoned, said application Ser. No. 258,293 being in part a continuation of my application Ser. No. 744,017 filed April 25, 1947, now abandoned.

This invention relates to weld metal deposits suitable for constituting hard facings on metallic articles as well as to arc welding electrodes for producing such deposits or facings.

It is an object of the invention to produce a weld metal deposit which can be worked with cutting tools in the as-welded state without any special pretreatment, and which can be caused to assume a high degree of hardness and wear resistance through a simple subsequent heat treating process. It is a further object of the invention to provide an improved arc welding electrode for producing a deposit of the type indicated. Other objects of the invention will be clear from the following specification.

According to a principal feature of the invention, the improved weld metal deposit consists of a precipitation hardening, substantially carbon free alloy of the type Fe–Co–M, in which M signifies metal from the group consisting of tungsten, molybdenum, niobium and tantalum, the cobalt content of said alloy being not less than 3% by weight and not more than the amount $Co_{max}$ indicated by the formula $$Co_{max} = 100\% - \frac{40W + 35Mo + 25Nb + 25Ta}{W + Mo + Nb + Ta}\%$$

in which the chemical signs W, Mo, Nb and Ta represent the individual percentages by weight of the respective metals in the alloy, the content of metal selected from the group consisting of tungsten, molybdenum, niobium and tantalum being not less than 4% by weight and not more than consistent with the formula $$W + \frac{8}{7}Mo + \frac{8}{5}Nb + \frac{8}{5}Ta = 40\%$$

in which the chemical signs W, Mo, Nb and Ta represent the individual percentages by weight of the respective metals in the alloy, the aggregate content of cobalt and metal of the group comprising tungsten, molybdenum, niobium and tantalum not exceeding 95%, the balance of the alloy being principally iron.

While carbon will practically always be present as an impurity, it is important that the content of carbon be kept as low as possible so as not to increase the hardness of the deposit in the as-welded condition. The carbon content must in no case exceed 0.3% and should preferably be kept below 0.1%. Other usual impurities are manganese and silicon, the aggregate content of which should not exceed 1% or at most 1.5%. Sulphur and phosphorus will cause no trouble in the low contents usual in weld metal deposits.

The invention also comprises an arc welding electrode adapted to produce a weld metal deposit of the kind above indicated. The arc welding electrode according to the invention consists of a metallic core and a coating consisting substantially of flux-forming substances, metallic substances and a binder, and the electrode is particularly characterized thereby that the metallic portion constituted by said core and said metallic substances consists substantially of cobalt, iron and at least one metal of the group consisting of tungsten, molybdenum, niobium and tantalum, the cobalt content of said metallic portion being not less than 3% by weight and not more than the amount $Co_{max}$ indicated by the formula $$Co_{max} = 100\% - \frac{40W + 35Mo + 25Nb + 25Ta}{W + Mo + Nb + Ta}\%$$

in which formula the chemical signs W, Mo, Nb and Ta represent the individual percentages of the respective metals by weight of said metallic portion, the content of metal selected from the group consisting of tungsten, molybdenum, niobium and tantalum being not less than 4% by weight and not more than consistent with the formula $$W + \frac{8}{7}Mo + \frac{8}{5}Nb + \frac{8}{5}Ta = 40\%$$

in which the chemical signs W, Mo, Nb and Ta represent the individual percentages by weight of said metallic portion, the aggregate content of cobalt and metal from the group indicated not exceeding 93% by weight of said metallic portion, the remainder of said metallic portion being principally iron. Deoxidants, as manganese and silicon, usually in the form of ferroalloys, may be present in the quantities usual in arc welding electrodes. At it is desired to obtain a weld metal of low carbon content, the carbon contents of the various metallic constituents of the welding electrode should be low.

The weld metals according to the present invention may be either ferritic, semi-ferritic, martensic or austenitic. For information concerning the metallography of these alloys, reference may be made to Archiv für das Eisenhüttenwesen 1931/32, page 431; the same 1932/33, page 17; and the same 1939/40, page 93, as well as to Houdremont: Handbuch der Sonderstahlkunde, Berlin 1943, pp. 726 ff.

The ternary alloys which are to be preferred according to the invention are tabulated here below:

TABLE

Composition preferred according to the invention for welding deposits consisting of ternary alloys of the type Fe–Co–M.

| Generally within the limits | | Preferably within the limits | | Particularly within the limits | | Type |
|---|---|---|---|---|---|---|
| Percent Co | Percent W | Percent Co | Percent W | Percent Co | Percent W | |
| 3–60 | 4–40 | | | | | |
| | | 3–12 | 12–30 | 9–12 | 12–15 | ferritic. |
| | | 20–40 | 6–20 | 26–32 | 10–16 | martensitic. |
| | | 42–46 | 23–30 | 43–44 | 28–30 | semi-ferritic. |
| | | 40–50 | 30–40 | 40–43 | 36–39 | austenitic. |
| Percent Co | Percent Mo | Percent Co | Percent Mo | Percent Co | Percent Mo | |
| 3–65 | 4–35 | | | | | |
| | | 3–18 | 10–30 | 8–12 | 15–18 | ferritic. |
| | | 25–38 | 5–15 | 28–30 | 8–12 | martensitic. |
| | | 37–40 | 15–20 | 39–40 | 15–17 | semi-ferritic. |
| | | 45–65 | 15–30 | 48–52 | 20–23 | austenitic. |
| Percent Co | Percent Ta or Nb | Percent Co | Percent Ta or Nb | Percent Co | Percent Ta or Nb | |
| 3–75 | 4–25 | | | | | |
| | | 5–15 | 12–20 | 9–11 | 15–17 | ferritic. |
| | | 25–50 | 8–20 | 46–50 | 8–14 | martensitic. |
| | | 68–70 | 12–14 | 68–70 | 12–14 | semi-ferritic. |
| | | 68–72 | 17–23 | 69–70 | 19–21 | austenitic. |

It should be understood that the invention is not limited to welding rods yielding a welding deposit consisting of ternary alloys, but also comprises rods the welding deposit of which contains two or more of the metals tungsten, molybdenum, niobium and tantalum.

The alloying elements of cobalt and one or more elements from the group comprising tungsten, molybdenum, niobium and tantalum, may be present in the welding rod of the present invention either in their elemental form or in the form of compounds. For instance, the welding rods may comprise a wire having substantially the same composition as the alloy to be deposited, with a fluxing coating of suitable composition, or they may consist of a metallic core provided with a coating containing additional metals or reducible metal compounds in such amounts that the alloy resulting from blending under welding conditions of the fused metals of the core with the fused metallic constituents of the coating or with the metals reduced out of the reducible metal compounds will have compositions as defined by the present invention.

The principal advantage of the welding rods of the present invention is that the weld metal obtained after rapid cooling from high temperatures, e. g. 1200–1300° C., which are normal welding temperatures, can be worked with cutting tools. The present invention provides directly machinable welds which can subsequently be hardened to hardnesses equal to or even surpassing those of the hard metals simply by annealing the welds to temperatures suited to the composition of the alloy in the range of from 500 to 700° C. This annealing also has the additional advantage of removing a martensitic zone that may incidentally be present in the base material.

Annealing of the metal weld of the present invention can be done by local heating, as with a carbon arc or by furnace heating when relatively small pieces are involved. Furnace heating gives the best results and is to be preferred where practicable. Different degrees of hardness can be obtained by varying the annealing temperatures and also by controlling the welding conditions, particularly the temperature of the work piece during welding.

Crack-proofness of the welds of the present invention is good since no hardening in the ordinary sense of the term occurs in the weld metal during welding (or during subsequent treatment). The weldability of the welding materials of the present invention is very good since the deposited alloys are almost completely free from carbon. Absence of carbon also minimizes the danger of forming pores and cracks in the welding.

The weld rods of the present invention are therefore very suitable for veneering wearing surfaces and the like, for the manufacture and repair of cutting tools, for the hard facing of rolling mill rolls, and the like.

The following table contains three examples of suitable coating mixtures for electrodes according to the invention having a core of iron or mild steel:

| Example | I | II | III |
|---|---|---|---|
| | Percent | Percent | Percent |
| Ferro-silicon (50%) | 2 | 2 | 3 |
| Ferro-manganese (80%) | 2 | 2 | 2 |
| Ferro-tungsten (80%) | 19 | | |
| Ferro-molybdenum (70%) | | 22 | |
| Ferro-columbium (65%) | | | 44 |
| Cobalt | 35 | 35 | 16 |
| Non-metallic flux | 42 | 39 | 35 |

The non-metallic flux may, for instance, be composed of

| | Percent |
|---|---|
| Limestone | 53 |
| Fluorspar | 36 |
| Rutile | 11 |

Each of the above coating compositions was mixed with a solution of potassium silicate to a paste-like consistency and extruded on 3.25 mm. core wires of mild steel (C=0.07), the diameters of the coating being 7.8 mm. for Examples I and II, and 6.8 mm. for Example III. The ratio of the weight of the dried coating to the eight of the core wire amounted to 1.99, 2.03, and 1.35 for Examples I to III, respectively. The compositions of the undiluted weld deposits obtained under normal welding conditions (positive polarity, 140 amps) with the electrodes thus composed were as follows:

| Example No. | I | II | III |
|---|---|---|---|
| | Percent | Percent | Percent |
| C | 0.07 | 0.07 | 0.07 |
| W | 14.7 | | |
| Mo | | 14.6 | |
| Nb | | | 17.6 |
| Co | 30.7 | 30.1 | 11.1 | remainder iron with insignificant amounts of Mn (0.5 to 0.7%), Si (about 0.04%), P and S (less than 0.02% each).

The above compositions I and II are of the martensitic type, while composition No. III belongs to the ferritic type.

According to another example, the coating is composed of the following mixture.

EXAMPLE IV

| | Percent |
|---|---|
| Ferro-silicon (50%) | 2 |
| Ferro-manganese (80%) | 2 |
| Ferro-molybdenum (70%) | 30 |
| Non-metallic flux | 66 |

The non-metallic flux may have the same composition as stated in connection with Examples I to III. The coating composition is mixed with a solution of potassium silicate and extruded on core wires of an iron-cobalt alloy containing 50% of each metal, the extruding diameter being such as to result in a ratio of about 1.08 between the weight of the dried coating and the weight of the core. The electrode thus manufactured will yield on welding under normal conditions (positive polarity, 125 amps in the case of a 3.25 mm. electrode) a weld deposit having the following composition (undiluted):

| | Percent |
|---|---|
| C | about 0.07 |
| Mo | about 17.2 |
| Co | about 38.5 |

Remainder iron with insignificant amounts of Mn and Si.

This alloy is of the semi-ferritic type.

In the Examples I to IV, all or a substantial part of the alloying additions are supplied by the coating. In the following Examples V to XVI, the electrode consists of a core containing all of the alloying additions required, while the coating consists of fluxing substances and deoxidants only.

| Example No. | Composition of core | | | | Type of weld deposit |
|---|---|---|---|---|---|
| | Co, Percent | W, Percent | Mo, Percent | Nb, Percent | |
| V | 12 | 12 | | | ferritic. |
| VI | 32 | 10 | | | martensitic. |
| VII | 44 | 28 | | | semi-ferritic. |
| VIII | 43 | 36 | | | austenitic. |
| IX | 12 | | 15 | | ferritic. |
| X | 30 | | 8 | | martensitic. |
| XI | 40 | | 15 | | semi-ferritic. |
| XII | 52 | | 20 | | austenitic. |
| XIII | 11 | | | 20 | ferritic. |
| XIV | 50 | | | 12.5 | martensitic. |
| XV | 70 | | | 16 | semi-ferritic. |
| XVI | 70 | | | 25 | austenitic. |

An example of a coating composition suitable for the above core compositions is:

| | Percent |
|---|---|
| Ferro-silicon (50%) | 2 |
| Ferro-manganese (80%) | 2 |
| Limestone | 51 |
| Fluorspar | 35 |
| Rutile | 10 |

A 3.25 mm. core wire of mild steel (C=0.06%) according to Example No. 5 provided with a coating of the above type having the diameter 4.6 mm. yields on welding under normal conditions (I=110 amps., positive polarity) a deposit of approximately the following composition (undiluted):

| | Percent |
|---|---|
| W | 13 |
| Co | 12 |

Remainder iron with insignificant amounts of silicon, manganese, and carbon.

It will be noted that said percentages of W and Co are within the narrow limits indicated in the last column of the first table of the present specification. Similarly, the cores VI to XVI when provided with a coating of the type above indicated will yield weld deposits of the kind indicated in said column.

The invention is not restricted to the above examples, but comprises all embodiments within the scope of the appended claims.

I claim:

1. A metal article having a metal deposit welded thereto, said deposit comprising a precipitation hardening, substantially carbon free alloy of the type Fe–Co–M, in which M signifies metal from the group consisting of tungsten, molybdenum, tantalum and niobium, the cobalt content of said alloy being not less than 3% by weight and not more than the amount $Co_{max}$ indicated by the formula $$Co_{max}=100\% - \frac{40W+35Mo+25Nb+25Ta}{W+Mo+Nb+Ta}\%$$

in which formula the chemical signs W, Mo, Nb and Ta represent the individual percentages by weight of the respective metals in the alloy, the content of metal selected from the group consisting of tungsten, molybdenum, tantalum and niobium being not less than 4% by weight and not more than consistent with the formula $$W+\frac{8}{7}Mo+\frac{8}{5}Nb+\frac{8}{5}Ta=40\%$$

in which the chemical signs W, Mo, Nb and Ta represent the individual percentages by weight of the respective metals in the alloy, the aggregate content of cobalt and of the group comprising tungsten, molybdenum, niobium and tantalum not exceeding 95%, the balance of the alloy being principally iron.

2. An arc welding electrode consisting of a metallic core and a coating consisting substantially of flux-forming substances, metallic substances, and a binder, characterized in that the metallic portion constituted by said core and said metallic substances consists substantially of cobalt, iron and at least one metal of the group consisting of tungsten, molybdenum, niobium and tantalum, the cobalt content of said metallic portion being not less than 3% by weight of said portion and not more than the amount $Co_{max}$ indicated by the formula $$Co_{max}=100\% - \frac{40W+35Mo+25Nb+25Ta}{W+Mo+Nb+Ta}\%$$

in which formula the chemical signs W, Mo, Nb and Ta represent the individual percentages of the respective metals by weight of said metallic portion, the content of metal selected from the group consisting of tungsten, molybdenum, niobium and tantalum being not less than 4% by weight and not more than consistent with the formula $$W\frac{8}{7}Mo+\frac{8}{5}Nb\frac{8}{5}Ta=40\%$$

in which the chemical signs W, Mo, Nb and Ta represent the individual percentages by weight of said metallic portion, the aggregate content of cobalt and metal from the group consisting of tungsten, molybdenum, niobium and tantalum not exceeding 93% by weight of said metallic portion, the remainder of said metallic portion being principally iron.

3. A metal article having a metal deposit welded thereto, said deposit comprising an alloy comprising 3 to 60% cobalt, 4 to 40% tungsten, the aggregate content of cobalt and tungsten not exceeding 95%, the balance being iron with incidental impurities.

4. A metal article having a metal deposit welded thereto, said deposite comprising an alloy composed of 3 to 65% cobalt, 4 to 35% molybdenum, the aggregate content of cobalt and molybdenum not exceeding 95%, the balance being iron with incidental impurities.

5. A metal article having a metal deposit welded thereto, said deposit comprising an alloy composed of 3 to 75% cobalt, 4 to 25% niobium, the aggregate content of cobalt and niobium not exceeding 95%, the balance being iron with incidental impurities.

6. A metal article having a metal deposit welded thereto, said deposit comprising an alloy composed of 3 to 75% cobalt, 4 to 25% tantalum, the aggregate content of cobalt and tantalum not exceeding 95%, the balance being iron with incidental impurities.

7. An arc welding electrode consisting of a metallic core and a coating consisting substantially of flux-forming substances, metallic substances, and a binder, characterized in that the metallic portion constituted by said core and said metallic substances contains 3 to 60% cobalt and 4 to 40% tungsten, the aggregate content of cobalt and tungsten not exceeding 93% by weight of said metallic portion, the balance of said metallic portion being iron with incidental impurities.

8. An arc welding electrode consisting of a metallic core and a coating consisting substantially of flux-forming substances, metallic substances, and a binder, characterized in that the metallic portion constituted by said core and said metallic substances contains 3 to 65% cobalt and 4 to 35% molybdenum, the aggregate content of cobalt and molybdenum not exceeding 93% by weight of said metallic portion, the balance of said metallic portion being iron with incidental impurities.

9. An arc welding electrode consisting of a metallic core and a coating consisting substantially of flux-forming substances, metallic substances, and a binder, characterized in that the metallic portion constituted by said core and said metallic substances contains 3 to 75% cobalt and 4 to 25% niobium, the aggregate content of cobalt and niobium not exceeding 93% by weight of said metallic portion, the balance of said metallic portion being iron with incidental impurities.

10. An arc welding electrode consisting of a metallic core and a coating consisting substantially of flux-forming substances, metallic substances, and a binder, characterized in that the metallic portion constituted by said core and said metallic substances contains 3 to 75% cobalt and 4 to 25% tantalum the aggregate content of cobalt and tantalum not exceeding 93% by weight of said metallic portion, the balance of said metallic portion being iron with incidental impurities.

(References on following page)

References Cited in the file of this patent

UNITED STATES PATENTS

| | | |
|---|---|---|
| 1,903,952 | Wissler | Apr. 18, 1933 |
| 2,160,423 | Stoody et al. | May 30, 1939 |
| 2,219,462 | Wissler | Oct. 29, 1940 |
| 2,513,472 | Franks | July 4, 1950 |
| 2,553,609 | Schmidt | May 22, 1951 |
| 2,611,710 | Woock | Sept. 23, 1952 |

FOREIGN PATENTS

| | | |
|---|---|---|
| 665,005 | Germany | Sept. 10, 1938 |
| 93,785 | Sweden | Dec. 14, 1938 |

---

UNITED STATES PATENT OFFICE
Certificate of Correction

Patent No. 2,871,552          February 3, 1959

Tore Måns Ivan Norén

It is hereby certified that error appears in the printed specification of the above numbered patent requiring correction and that the said Letters Patent should read as corrected below.

Column 1, line 43, for "aloy" read —alloy—; column 2, line 7, indistinct portion of the formula, for "+3 " read —+35—; line 26, for "At" read —As—; line 47, in the table, heading to columns 1 and 2 thereof, after "Generally" strike out "with-"; column 4, line 6, for "eight" read —weight—; column 6, lines 8 to 10 should appear as shown below instead of as in the patent—

$$W + \frac{8}{7}Mo + \frac{8}{5}Nb + \frac{8}{5}Ta = 40\%$$

line 24, for "deposite" read —deposit—.

Signed and sealed this 26th day of May 1959.

[SEAL]

Attest:
KARL H. AXLINE,
*Attesting Officer.*

ROBERT C. WATSON,
*Commissioner of Patents.*

UNITED STATES PATENT OFFICE
CERTIFICATE OF CORRECTION

Patent No. 2,871,552                                                  February 3, 1959

Tore Måns Ivan Norén

It is hereby certified that error appears in the printed specification of the above numbered patent requiring correction and that the said Letters Patent should read as corrected below.

Column 2, line 31, for "martensic" read -- martensitic --.

Signed and sealed this 28th day of July 1959.

(SEAL)
Attest:

KARL H. AXLINE                                               ROBERT C. WATSON
Attesting Officer                                           Commissioner of Patents

UNITED STATES PATENT OFFICE
Certificate of Correction

Patent No. 2,871,552                           February 3, 1959

Tore Måns Ivan Norén

It is hereby certified that error appears in the printed specification of the above numbered patent requiring correction and that the said Letters Patent should read as corrected below.

Column 1, line 43, for "aloy" read —alloy—; column 2, line 7, indistinct portion of the formula, for "+3" read —+35—; line 26, for "At" read —As—; line 47, in the table, heading to columns 1 and 2 thereof, after "Generally" strike out "with-"; column 4, line 6, for "eight" read —weight—; column 6, lines 8 to 10 should appear as shown below instead of as in the patent—

$$W + \frac{8}{7}Mo + \frac{8}{5}Nb + \frac{8}{5}Ta = 40\%$$

line 24, for "deposite" read —deposit—.

Signed and sealed this 26th day of May 1959.

[SEAL]

Attest:
KARL H. AXLINE,
*Attesting Officer.*

ROBERT C. WATSON,
*Commissioner of Patents.*

UNITED STATES PATENT OFFICE
CERTIFICATE OF CORRECTION

Patent No. 2,871,552 February 3, 1959

Tore Måns Ivan Norén

It is hereby certified that error appears in the printed specification of the above numbered patent requiring correction and that the said Letters Patent should read as corrected below.

Column 2, line 31, for "martensic" read -- martensitic --.

Signed and sealed this 28th day of July 1959.

(SEAL)
Attest:

KARL H. AXLINE
Attesting Officer

ROBERT C. WATSON
Commissioner of Patents